United States Patent
Yamaguchi

(10) Patent No.: US 11,581,768 B2
(45) Date of Patent: Feb. 14, 2023

(54) ELECTRIC MOTOR AND MANUFACTURING METHOD OF ELECTRIC MOTOR

(71) Applicant: FANUC CORPORATION, Minamitsuru-gun (JP)

(72) Inventor: Akira Yamaguchi, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 218 days.

(21) Appl. No.: 17/108,863

(22) Filed: Dec. 1, 2020

(65) Prior Publication Data
US 2021/0167650 A1 Jun. 3, 2021

(30) Foreign Application Priority Data
Dec. 3, 2019 (JP) .............................. JP2019-218528

(51) Int. Cl.
| | |
|---|---|
| H02K 3/48 | (2006.01) |
| H02K 3/12 | (2006.01) |
| H02K 1/16 | (2006.01) |
| H02K 15/04 | (2006.01) |
| H02K 15/06 | (2006.01) |
| H02K 7/00 | (2006.01) |

(52) U.S. Cl.
CPC ............ *H02K 3/12* (2013.01); *H02K 1/16* (2013.01); *H02K 3/48* (2013.01); *H02K 15/04* (2013.01); *H02K 15/065* (2013.01); *H02K 7/003* (2013.01)

(58) Field of Classification Search
CPC .. H02K 3/12; H02K 1/16; H02K 3/48; H02K 15/04; H02K 15/065; H02K 7/003; H02K 3/28
See application file for complete search history.

(56) References Cited

U.S. PATENT DOCUMENTS

| | | | | |
|---|---|---|---|---|
| 7,557,483 | B2* | 7/2009 | Yasuhara | H02K 3/28 310/198 |
| 7,659,651 | B2* | 2/2010 | Obata | B60L 15/007 310/180 |
| 8,803,384 | B2* | 8/2014 | Hull | H02P 25/18 310/179 |
| 8,836,195 | B2* | 9/2014 | Yokochi | H02K 3/28 310/179 |
| 9,077,216 | B2* | 7/2015 | Koga | H02K 3/12 |
| 10,305,339 | B2* | 5/2019 | Awazu | H02K 3/12 |
| 10,411,530 | B2* | 9/2019 | Toi | H02K 3/28 |
| 2017/0093238 | A1* | 3/2017 | Toi | H02K 3/28 |
| 2019/0260253 | A1* | 8/2019 | Favre | H02K 1/16 |

FOREIGN PATENT DOCUMENTS

JP 2018-157753 A 10/2018

* cited by examiner

*Primary Examiner* — Burton S Mullins
(74) *Attorney, Agent, or Firm* — McGinn I.P. Law Group, PLLC

(57) ABSTRACT

An electric motor includes a shaft, and a stator disposed around the outer periphery of the shaft and including a plurality of slots extending toward the shaft. A plurality of coil units are arranged respectively in the plurality of slots. The coil units are each formed of a plurality of wires connected in parallel. One of the coil units that is arranged in at least one of the plurality of slots formed in the stator includes a plurality of winding groups that are connected in series and that have a different number of turns from each other. The winding groups are arranged in the slot in descending order of the number of turns in the direction toward the shaft.

6 Claims, 5 Drawing Sheets

ELECTRIC MOTOR AND MANUFACTURING METHOD OF ELECTRIC MOTOR

CROSS-REFERENCE TO RELATED APPLICATION

This application is based upon and claims the benefit of priority from Japanese Patent Application No. 2019-218528 filed on Dec. 3, 2019, the contents of which are incorporated herein by reference.

BACKGROUND OF THE INVENTION

Field of the Invention

The present invention relates to an electric motor and a method of manufacturing the electric motor.

Description of the Related Art

As a general configuration of an electric motor, there is known a configuration in which slots are formed in a stator and a coil unit is provided in each slot. An example of such an electric motor is disclosed in, for example, Japanese Laid-Open Patent Publication No. 2018-157753. According to the disclosure, the coil unit (unit coil) has a plurality of winding groups (coil groups), and the plurality of winding groups may be provided in one slot.

SUMMARY OF THE INVENTION

In an electric motor having the above configuration, including the configuration disclosed in Japanese Laid-Open Patent Publication No. 2018-157753, magnetic flux leakage occurs in the coil unit provided in the slot. This flux leakage causes variation in the inductance of the coil unit.

It is, therefore, an object of the present invention to provide an electric motor and a method of manufacturing the electric motor in which variation in inductance of the coil unit due to flux leakage is reduced.

An aspect of the invention resides in an electric motor including: a shaft; and a stator disposed around the outer periphery of the shaft and configured to include a plurality of slots extending toward the shaft, wherein a plurality of coil units are arranged respectively in the plurality of slots, the coil units each including a plurality of wires connected in parallel, wherein: one of the coil units that is arranged in at least one of the plurality of slots formed in the stator includes a plurality of winding groups that are connected in series and that have a different number of turns from each other, and the winding groups are arranged in the slot in descending order of the number of turns in a direction toward the shaft.

Another aspect of the invention resides in a manufacturing method of an electric motor including a shaft, and a stator disposed around the outer periphery of the shaft, the stator including a plurality of slots extending toward the shaft, including: a first step of forming a coil unit including a plurality of wires connected in parallel, so as to include a plurality of winding groups that are connected in series and that have a different number of turns from each other; and a second step of setting the plurality of winding groups into at least one of the plurality of slots formed in the stator, so as to arrange the winding groups in descending order of the number of turns in a direction toward the shaft.

According to the present invention, it is possible to provide an electric motor and a method of manufacturing the electric motor in which variation in inductance of the coil unit due to flux leakage can be reduced.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, an electric motor and a manufacturing method for the electric motor according to the present invention will be detailed by describing a preferred embodiment with reference to the accompanying drawings.

Embodiment

An electric motor 10 of the present embodiment includes a shaft 12 provided as a rotary shaft, a rotor 14 attached to the shaft 12, and a stator 16.

Of these, the shaft 12 and the rotor 14 in this embodiment can be configured based on known technologies. Therefore, detailed description of the shaft 12 and the rotor 14 will be omitted below.

Figure 1:
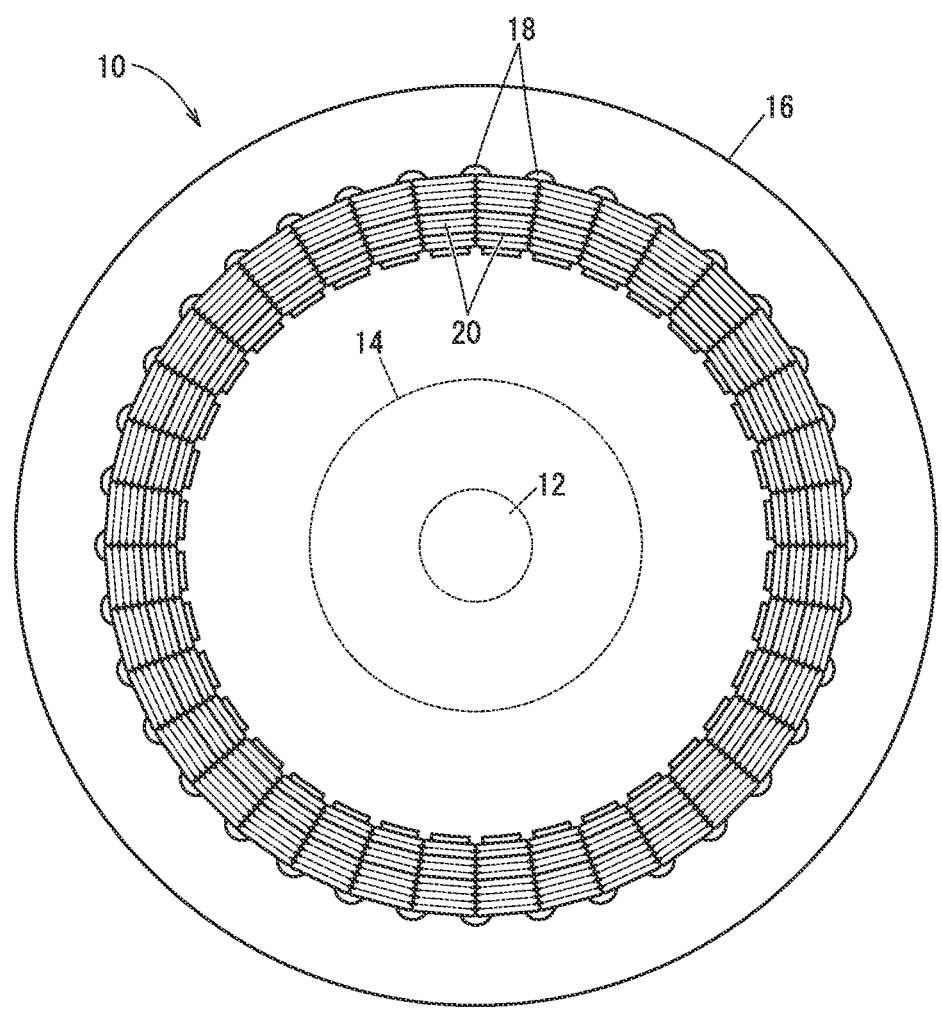
FIG. 1 is a cross-sectional view of an electric motor of an embodiment of the present invention.

FIG. 1 is a cross-sectional view of the electric motor 10 of the present embodiment. The drawing in FIG. 1 is viewed from a point on the axis of the shaft 12.

The stator 16 is an approximately tubular member arranged around the shaft 12 and the rotor 14. In FIG. 1, the approximate positions of the shaft 12 and the rotor 14 are shown by broken lines. The stator 16 of the present embodiment has a substantially cylindrical shape, but the shape of the stator 16 is not limited to this, and may have a rectangular tubular shape, for example.

The tubular stator 16 has, formed on the inner peripheral side, a plurality of slots 18 that extend in the axial direction of the shaft 12. The plurality of slots 18 are arranged radially so as to extend toward the shaft 12 with the stator 16 being set around the outer periphery of the shaft 12. Each of the plurality of slots 18 includes a coil unit 20 to which electric current is supplied to rotate the shaft 12.

Figure 2:
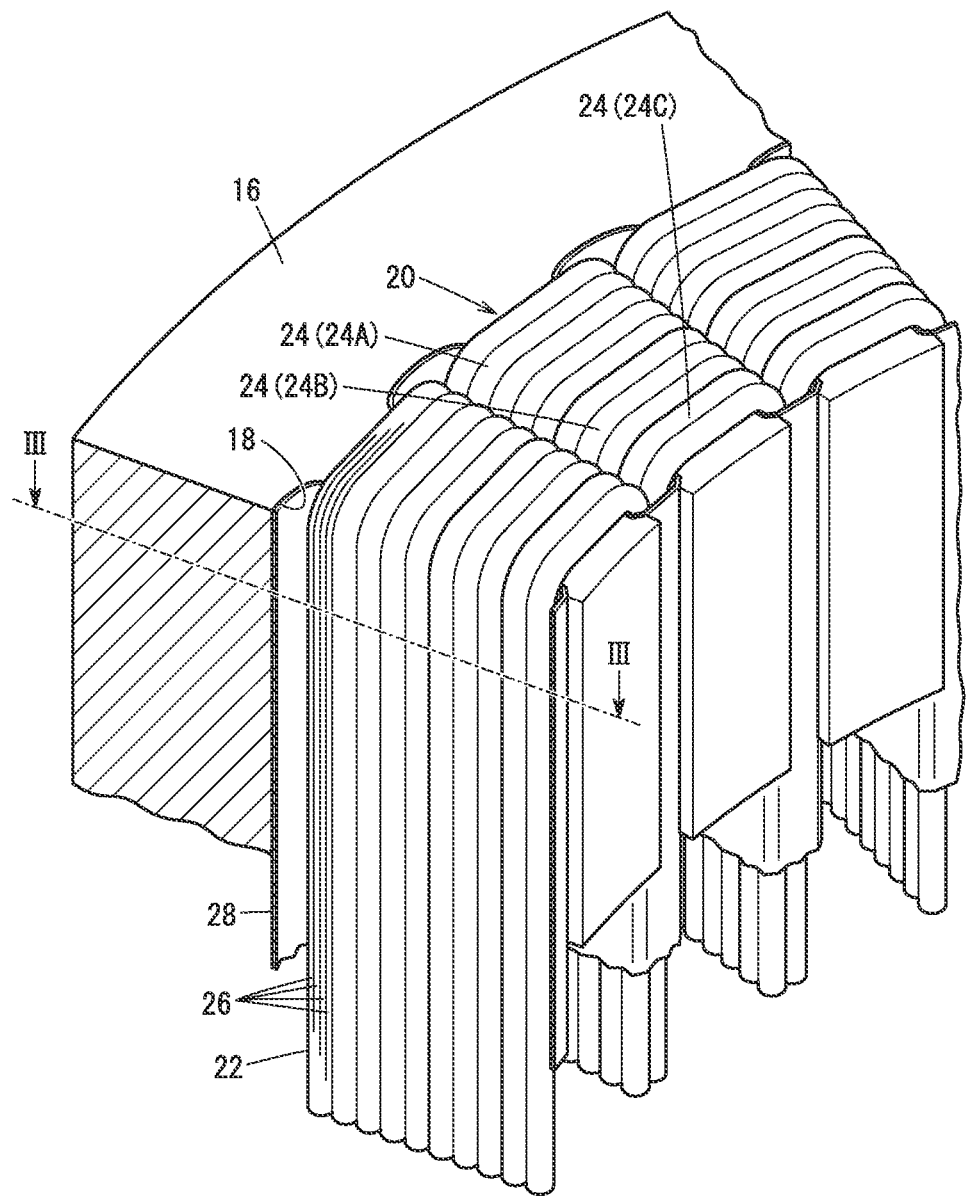
FIG. 2 is a diagram for explaining slots and coil units of the embodiment.

FIG. 2 is a diagram for explaining the slots 18 and the coil units 20 of the present embodiment. Note that FIG. 2 is a perspective enlarged view showing a part of the stator 16 of the present embodiment.

The coil unit 20 is formed of a plurality of winding groups 24 connected in series with each other, and the winding groups each have a wiring 22 wound substantially spirally by a predetermined number of turns. The wiring 22 is formed by bundling multiple wires 26 and connecting them in parallel with each other. A general enamel wire may be used for the wires 26 forming the wiring 22. The number of turns in the coil unit 20 is not particularly limited, but is assumed to be 10, for example, in the present embodiment.

The plurality of winding groups 24 included in each coil unit 20 include two or more winding groups 24 having different numbers of turns, and are arranged into the slot 18, in descending order of the number of turns in the direction toward the shaft 12.

It is assumed hereinafter that three winding groups 24 are provided in each slot 18 and referred to as a first winding group 24A, a second winding group 24B and a third winding group 24C in order from the one farthest from the shaft 12.

In the present embodiment, the first winding group 24A has five turns, the second winding group 24B has three turns, and the third winding group 24C has two turns. The number of turns of each of the first winding group 24A, the second winding group 24B and the third winding group 24C is not limited to the above. For example, the first winding group 24A may have four turns, the second winding group 24B may have three turns, and the third winding group 24C may have three turns.

Figure 3:
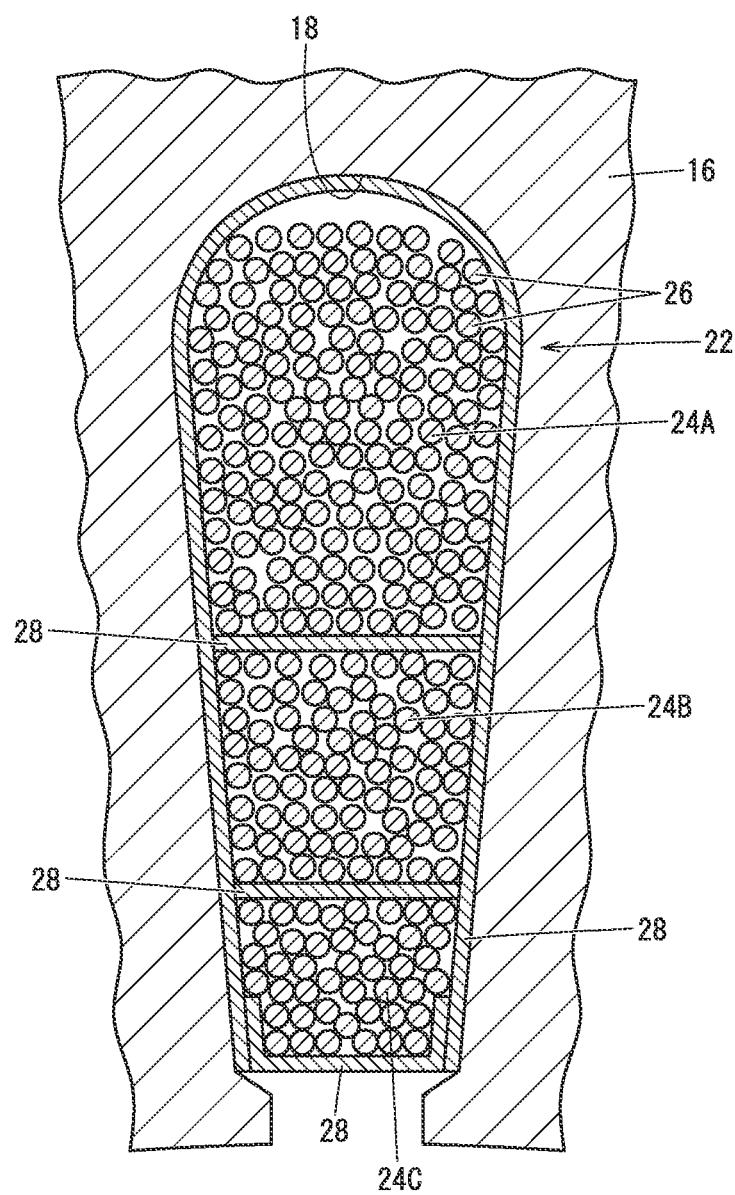
FIG. 3 is a cross-sectional view taken along a line of FIG. 2.

FIG. 3 is a cross-sectional view taken along a line III-III of FIG. 2.

The electric motor 10 of the present embodiment further includes an insulating member 28 that separates the plurality of winding groups 24 located adjacent to each other in the slot 18, with respect to the direction toward the shaft 12. This can prevent unintended electrical interference between the plurality of winding groups 24 in the slot 18.

The insulating member 28 is a material having an insulating property (insulative material), and is, for example, a thin insulating sheet, an insulating film, or an insulating tape. The insulating member 28 is provided in the slot 18 so as to extend in the axial direction of the shaft 12. Further, in addition to the arrangement of the insulating member 28 between the plurality of winding groups 24, the insulating member 28 is preferably provided so as to prevent direct contact between the wires 26 and the inner surface of the slot 18 as shown in FIG. 3.

Figure 4:
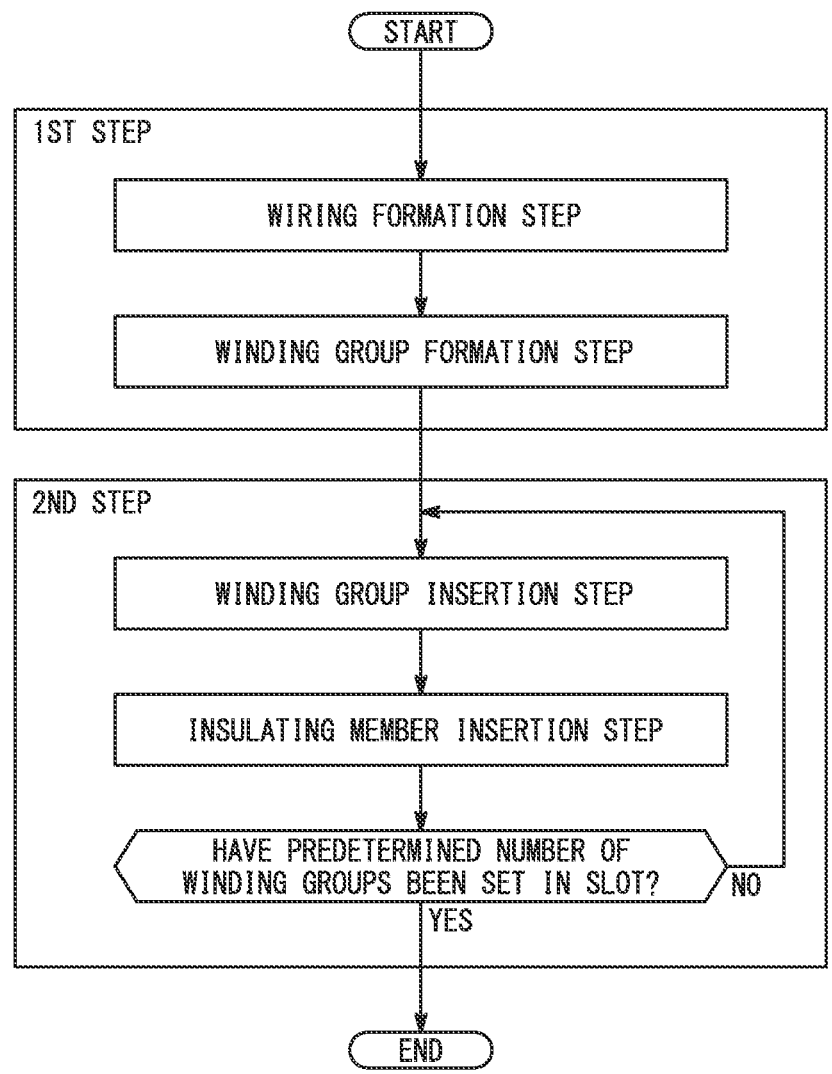
FIG. 4 is a flowchart showing an example of a manufacturing method of an electric motor according to an embodiment of the present invention.

FIG. 4 is a flowchart showing an example of a manufacturing method of the electric motor 10 of the present embodiment.

Now, a manufacturing method of the electric motor 10 having the above configuration (hereinafter, simply manufacturing method) will be described. This manufacturing method includes a first step and a second step. The following will be described step by step.

In the first step, the coil unit 20 composed of a plurality of wires 26 connected in parallel is formed so as to have a plurality of winding groups 24 connected in series, each having a different numbers of turns.

The first step includes a wiring formation step of forming a wiring 22 in which a plurality of wires 26 are connected in parallel, and a winding group formation step of forming a plurality of winding groups 24 by spirally winding the wiring 22.

The wiring formation step can be performed by bundling a plurality of wires 26. As the wires 26, a general enamel wire can be adopted as described above. The number of wires 26 to be bundled is not particularly limited, but it is preferable that all the coil units 20 provided in the electric motor 10 have the same number of wires.

The winding group formation step can be easily performed by using a bobbin that winds the wiring 22. That is, in the winding group formation step, the first winding group 24A can be easily formed by winding the wiring 22 on the bobbin for only 5 turns. Then, the second winding group 24B can be easily formed by winding a portion of the wiring 22 that is not wound as the first winding group 24A, for only three turns. Similarly, the third winding group 24C can be easily formed by winding the remaining portion of the wiring 22 for only two turns.

Thus, the first step forms the coil unit 20 having a plurality of winding groups 24 connected with each other in series. At maximum, as many coil units 20 as the number of slots 18 formed in the stator 16 can be prepared.

In the second step, the plurality of winding groups 24 are set in each of all the slots 18 formed in the stator 16, in descending order of the number of turns, in the direction toward the shaft 12. Since the stator 16 with multiple slots 18 can be obtained by a method based on known technologies, the description thereof is omitted here.

The second step includes a winding group insertion step of setting one of the plurality of winding groups 24 in the slot 18 and an insulating member insertion step of inserting the insulating member 28 between the multiple winding groups 24 which are adjacent to each other in the direction toward the shaft 12.

In the winding group insertion step, a winding group 24 having the largest number of turns is selected from the plurality of winding groups 24 not yet set in the slot 18, and the selected one is then mounted in the slot 18. In the insulating member insertion step, the insulating member 28 is mounted in the slot 18 so as to be adjacent to the winding group 24, which has been inserted in the slot 18 in the winding group insertion step, with respect to the direction toward the shaft 12.

The winding group insertion step and the insulating member insertion step can be repeatedly implemented until a predetermined number (three in the present embodiment) of the winding groups 24 are provided in the slot 18.

Further, the winding group insertion step and the insulating member insertion step can be performed for each of the plurality of slots 18. As a result, for all the slots 18, the above configuration can be obtained, in which the first winding group 24A, the insulating member 28, the second winding group 24B, the insulating member 28, and the third winding group 24C are set in this order along the direction toward the shaft 12. That is, in all the slots 18 of the stator 16, it is possible to obtain a configuration in which a plurality of winding groups 24 are provided in order from the one having the largest number of turns, along the direction toward the shaft 12 and the insulating member 28 is arranged at each of the interfaces between winding groups 24.

According to the manufacturing method including the first step and the second step described above, the electric motor 10 (FIG. 1) of the present embodiment can be easily manufactured.

Now, one of the viewpoints disclosed by this embodiment will be described. In the type of the electric motor 10 in which coils are provided in the slots 18 of the stator 16, if there are variations in the inductance L of the multiple wires 26 forming the coil unit 20, the electric current flowing through the coil unit 20 is unstable. This makes it difficult to obtain a stable output from the electric motor 10. This situation will be described below with reference to specific examples.

Figure 5A:
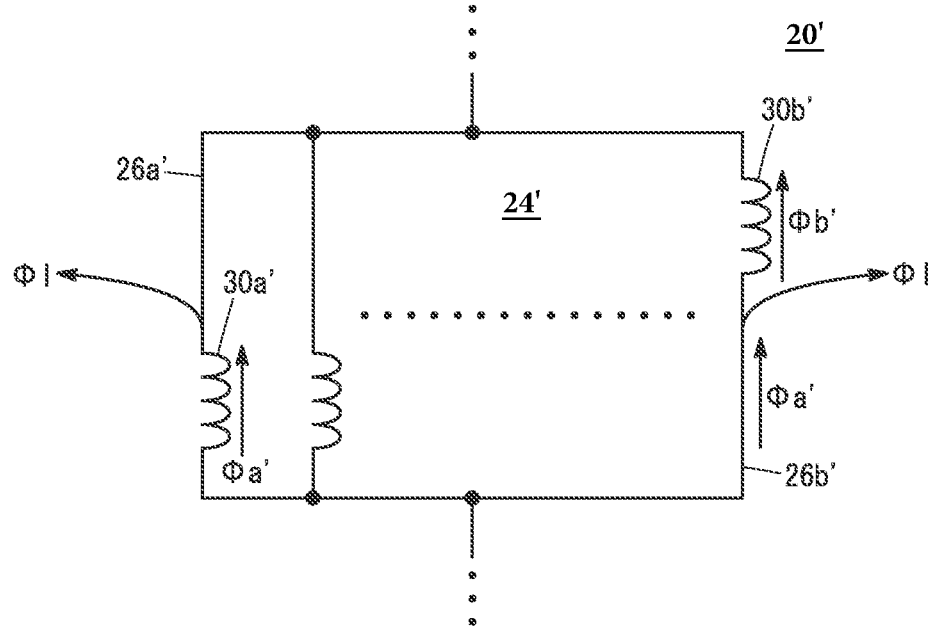
FIG. 5A is a diagram for explaining a conventional coil unit in which the inductance is not stable.

FIG. 5A is a diagram for explaining a conventional coil unit 20' in which the inductance L is not stable. In FIG. 5A, elements positioned on the upper side represent the elements located on the rear side in the length direction of the wire 26 (i.e., located on the shaft 12 side), whereas elements positioned on the lower side represent the elements located on the front side in the length direction of the wire 26 (i.e., located on the outer peripheral side).

FIG. 5A schematically shows one of a plurality of winding groups 24' arranged in the conventional coil unit 20' to which the present embodiment is not applied. In FIG. 5A, a wire 26a' and a wire 26b' are two of the n wires 26 forming the coil unit 20'.

The wire 26a' has a winding portion 30a' belonging to the winding group 24'. Similarly, the wire 26b' has a winding portion 30b' belonging to the winding group 24'. Regarding the length direction of the wire 26, the position of the winding portion 30a' in the length direction of the wire 26 is located more on the front side than the position of the winding portion 30b'. Thus, the position of the winding portion 30a' on the wire 26a' and the position of the winding portion 30b' on the wire 26b' vary within the range of the wound length of the winding group 24' even if the winding portion 30a' and the winding portion 30b' belong to the same winding group 24'. This difference in position is more likely to occur as the winding length of the winding group 24' is longer, that is, as the number of winding groups 24' is less, and as the number of turns in one winding group 24' is increased.

If the position of the winding portion 30a' and the position of the winding portion 30b' are different from (i.e., away from) each other in the length direction of the wire 26, a magnetic flux Φa' generated in the winding portion 30a' and a magnetic flux Φb' generated in the winding portion 30b' become different in magnitude due to a leakage flux Φl (FIG. 5A). That is, in the example of FIG. 5A, the magnitude of the magnetic flux Φb' is smaller than the magnetic flux Φa' by the amount of the leakage flux Φl (Φb'=Φa'−Φl).

As a result, a difference appears between the inductance La' of the winding portion 30a' determined based on the magnitude of the magnetic flux Φa' and the inductance Lb' of the winding portion 30b' determined based on the magnitude of the magnetic flux Φb'. This difference corresponds to the aforementioned variation in the inductance L (La', Lb'). It is noted that the leakage flux Φl becomes greater as the position of winding is closer to the shaft 12. Therefore, the above-mentioned variation in the inductance L becomes greater as the difference in position in the length direction of the wire 26 between the winding portion 30a' and the winding portion 30b' occurs at a position closer to the shaft 12.

Figure 5B:
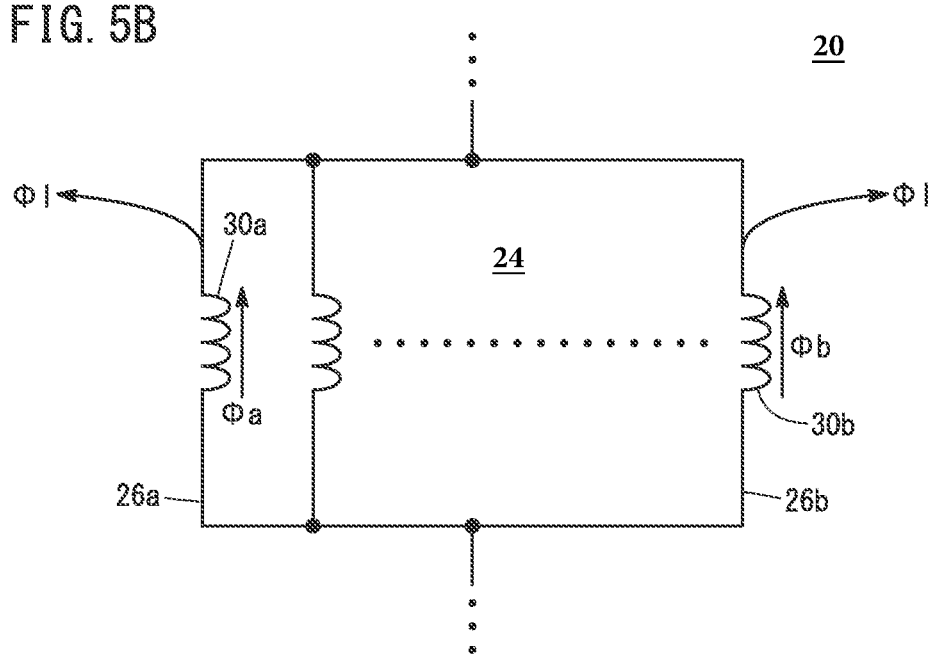
FIG. 5B is a diagram for explaining a coil unit of the present embodiment.

FIG. 5B is a diagram for explaining the coil unit 20 of the present embodiment. In FIG. 5B, the elements positioned on the upper side represent the elements located on the rear side in the length direction of the wire 26 (i.e., located on the shaft 12 side), whereas the elements positioned on the lower side represent the elements located on the front side in the length direction of the wire 26 (i.e., located on the outer peripheral side).

FIG. 5B schematically shows one of a plurality of winding groups 24 included in the coil unit 20 of the present embodiment. In FIG. 5B, the wire 26a and the wire 26b are two of the n wires 26 forming the coil unit 20.

In the present embodiment, the coil unit is formed such that the winding groups 24 are arranged in the slot 18 in order from the winding group that has the largest number of turns, in the direction toward the shaft 12. Therefore, the number of turns is further suppressed for the winding group 24 involving a larger leakage flux Φl, and as a result, the positional difference in the length direction of the wire 26 between the winding portion 30a and the winding portion 30b can be reduced, or the positional difference can be easily adjusted at the manufacturing stage (winding group formation step).

Since the positional difference between the winding portion 30a and the winding portion 30b is reduced, the difference, due to the leakage flux Φl, between the magnetic flux Φa generated in the winding portion 30a and the magnetic flux Φb generated in the winding portion 30b is also reduced, so that the difference between the inductance La of the winding portion 30a and the inductance Lb of the winding portion 30b can be reduced.

That is, according to the present embodiment, it is possible to provide an electric motor 10 and a method of manufacturing the electric motor 10 in which variation in the inductance L of the coil unit 20 due to the leakage flux Φl can be reduced.

Further, in the present embodiment, of the first winding group 24A, the second winding group 24B, and the third winding group 24C arranged in this order toward the shaft 12, the first winding group 24A which is relatively far from the shaft 12, is made to have a relatively large number of turns. As a result, for the winding group 24 close to the shaft 12, which is more likely to be subjected to the influence of the leakage flux Φl, variation in the inductance L is reduced, while the number of steps for manufacturing the electric motor 10 can be suppressed from increasing.

[Modification]

Though the embodiment has been described above as an example of the present invention, it goes without saying that various changes or improvements can be added to the above embodiment. It is apparent from the claims that such modified or improved forms may also be included in the technical scope of the present invention.

In the embodiment, a configuration has been described in which a plurality of winding groups 24 are arranged in each slot 18 of the stator 16 in descending order of the number of turns toward the shaft 12.

However, the present invention is not limited to the above. For example, a plurality of winding groups 24 may be arranged in descending order of the number of turns toward the shaft 12, for at least one of the plurality of slots 18 in the stator 16.

This makes it possible to suppress variation in the inductance L of the coil unit 20 due to the leakage flux Φl for at least one of the slots 18.

The insulating member 28 may be omitted from the configuration of the electric motor 10. Similarly, the insulating member insertion step may be omitted from the manufacturing method of the electric motor 10.

[Invention Obtained from the Embodiment]

The aspects of the invention that can be grasped from the above embodiment and modifications are described below.

An electric motor (10) includes: a shaft (12); and a stator (16) disposed around the outer periphery of the shaft (12) and configured to include a plurality of slots (18) extending toward the shaft (12). A plurality of coil units (20) are arranged respectively in the plurality of slots (18), and the coil units are each formed of a plurality of wires (26) connected in parallel. One of the coil units (20) that is arranged in at least one of the plurality of slots (18) formed in the stator (16) includes a plurality of winding groups (24) that are connected in series and that have a different number of turns from each other, and the winding groups (24) are arranged in the slot (18) in descending order of the number of turns in the direction toward the shaft (12).

With the above configuration, it is possible to provide an electric motor (10) which is capable of reducing variation in the inductance (L) of the coil unit (20) due to the leakage flux (Φ1).

The coil units (20) arranged in all the slots (18) formed in the stator (16) each may have a plurality of the winding groups (24) that are connected in series and that have a different number of turns from each other, and the winding groups (24) are arranged in each of the slots (18), in descending order of the number of turns in the direction toward the shaft (12). With this configuration, it is possible to provide an electric motor (10) which is capable of further reducing variation in the inductance (L) of the coil units (20) due to the leakage flux (Φ1).

The above electric motor (10) further includes an insulating member (28) provided between the plurality of winding groups (24) adjacent to each other in the direction toward the shaft (12). This configuration makes it possible to prevent the plurality of winding groups (24) in the slot (18) from causing electrical interference between the winding groups.

A manufacturing method of an electric motor (10) including a shaft (12), and a stator (16) disposed around the outer periphery of the shaft (12), the stator including a plurality of slots (18) extending toward the shaft (12), includes: a first step of forming a coil unit (20) including a plurality of wires (26) connected in parallel, so as to include a plurality of winding groups (24) that are connected in series and that have a different number of turns from each other; and a second step of setting the plurality of winding groups (24) into at least one of the plurality of slots (18) formed in the stator (16), so as to arrange the winding groups in descending order of the number of turns in a direction toward the shaft (12).

With the above configuration, it is possible to provide a manufacturing method of an electric motor (10) which is capable of reducing variation in the inductance (L) of the coil unit (20) due to the leakage flux (Φ1).

In the second step, the plurality of winding groups (24) may be arranged in each of all the slots (18) formed in the stator (16), in descending order of the number of turns in the direction toward the shaft (12). With this configuration, it is possible to provide a manufacturing method of an electric motor (10) which is capable of further reducing variation in the inductance (L) of the coil units (20) due to the leakage flux (Φ1).

The second step may include a step of providing an insulating member (28) between the plurality of winding groups (24) adjacent to each other in the direction toward the shaft (12). This configuration makes it possible to prevent the plurality of winding groups (24) from causing electrical interference between the winding groups, in the slot (18).

What is claimed is:

1. An electric motor comprising:
    a shaft; and
    a stator disposed around an outer periphery of the shaft and configured to include a plurality of slots extending toward the shaft, wherein a plurality of coil units are arranged respectively in the plurality of slots, the coil units each comprising a plurality of wires connected in parallel, wherein:
    one of the coil units that is arranged in at least one of the plurality of slots formed in the stator includes a plurality of winding groups that are connected in series and that have a different number of turns from each other, and the winding groups are arranged in the slot in descending order of the number of turns in a direction toward the shaft.

2. The electric motor according to claim 1, wherein the coil units arranged in all the slots formed in the stator each have a plurality of the winding groups that are connected in series and that have a different number of turns from each other, and the winding groups are arranged in each of the slots, in descending order of the number of turns in the direction toward the shaft.

3. The electric motor according to claim 1, further comprising an insulating member provided between the plurality of winding groups adjacent to each other in the direction toward the shaft.

4. A manufacturing method of an electric motor including a shaft, and a stator disposed around an outer periphery of the shaft, the stator including a plurality of slots extending toward the shaft,
    the manufacturing method, comprising:
    a first step of forming a coil unit comprising a plurality of wires connected in parallel, so as to include a plurality of winding groups that are connected in series and that have a different number of turns from each other; and
    a second step of setting the plurality of winding groups into at least one of the plurality of slots formed in the stator, so as to arrange the winding groups in descending order of the number of turns in a direction toward the shaft.

5. The manufacturing method of the electric motor according to claim 4, wherein, in the second step, the plurality of winding groups are arranged in each of all the slots formed in the stator, in descending order of the number of turns in the direction toward the shaft.

6. The manufacturing method of the electric motor according to claim 4, wherein the second step includes a step of providing an insulating member between the plurality of winding groups adjacent to each other in the direction toward the shaft.

* * * * *